Oct. 25, 1932.  M. RALL ET AL  1,884,224
LUBRICATION OF BEARINGS
Filed Jan. 6, 1931
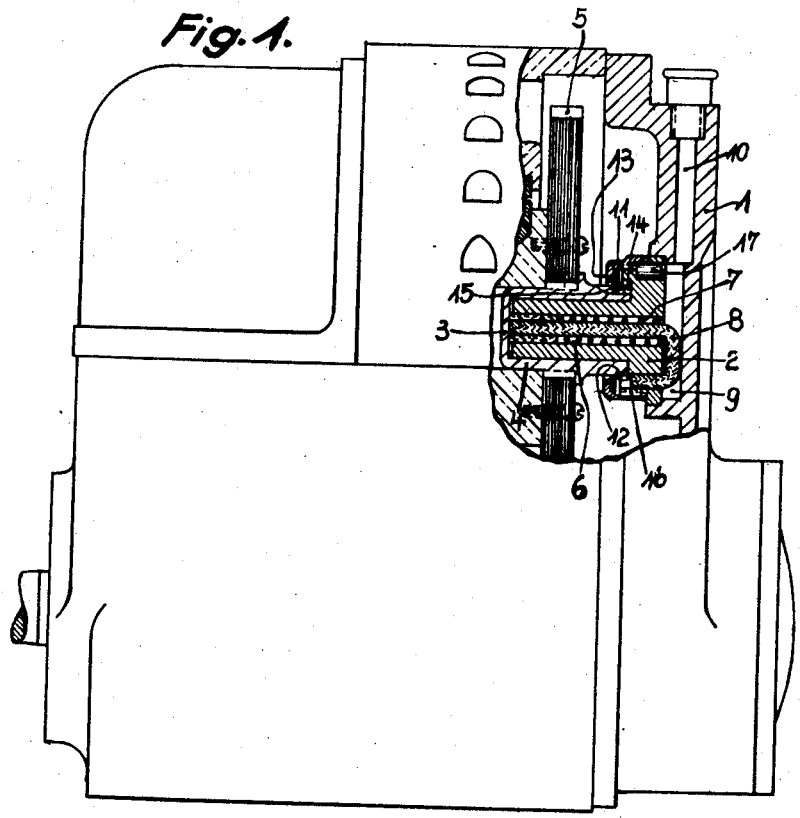
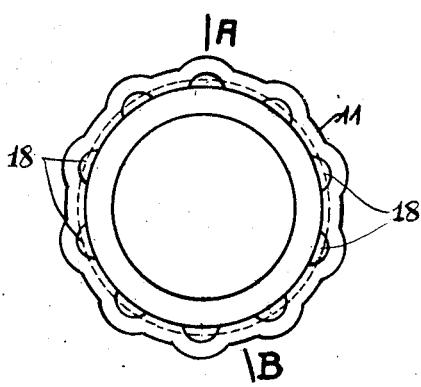
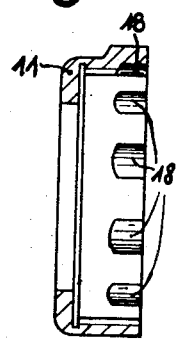
Inventors
Max Rall
Heinrich Bischoff
by Steward & McKay
their attorneys Patented Oct. 25, 1932

1,884,224

UNITED STATES PATENT OFFICE

MAX RALL, OF STUTTGART, AND HEINRICH BISCHOFF, OF STUTTGART-BOTNANG, GERMANY, ASSIGNORS TO ROBERT BOSCH AKTIENGESELLSCHAFT, OF STUTTGART, GERMANY

LUBRICATION OF BEARINGS

Application filed January 6, 1931, Serial No. 506,992, and in Germany January 16, 1930.

This invention relates to improvements in the lubrication of bearings.

The invention is more particularly described with reference to the lubrication of the distributor bearing of a magneto ignition device. In a known construction a wick is arranged in the hollow pin in which rotates a bush with the distributor gear wheel mounted thereon, the wick sucking oil out of an oil chamber and delivering it to felt pads which are mounted in radial bores of the bearing pin and are pressed against the inner surfaces of the bush. As the bush is open at one end the oil can issue thence and is sprayed into the magneto ignition device by the centrifugal force of the rotating parts.

This method of oiling has many disadvantages which are avoided by the arrangement of this invention in that the bush engages over the free end of the pin in the manner of a cap and a lubricating wick arranged in the axial bore of this pin is pressed against the front wall of the bush by a spring.

One form of construction of the invention is illustrated by way of example in the accompanying drawing in which:—

Figure 1 is a magneto ignition device having the distributor bearing in section.

Figure 2 is a view on an enlarged scale of the screw cap.

Figure 3 is a section on the line A–B of Figure 2.

The bush 4 which is provided with an end wall 3 and on which a distributor gear wheel 5 is screwed is rotatably mounted on the pin 2 mounted on the cover 1 of the distributor housing. A spring 7 has a lubricating wick 8 tightly drawn through it and arranged in the axial bore 6 of the pin. One end of the wick is pressed by the spring against the front wall of the bush, whilst the other end dips into the oil chamber 9 which can be filled through the channel 10.

The bush is secured against axial displacement by a screw cap 11 and an annular disc 13 arranged between the front wall of the nut and a spring ring 12 inserted in an annular groove of the bush. The annular disc is prevented against rotation against this by a nose piece 15 engaging in the groove 14 of the bush. The adjustment of play of the bush can be varied by the extent to which the screw cap is screwed on. After adjusting the play the nut is secured against any further displacement by a peg 17 in the flange of the pin which can engage in recesses 18 in the cap.

In this arrangement the oil passes through the wick to the front wall of the bearing surface and is thence spread over the upper surface of the pin. The oil which reaches the open end of the bush is arrested at the flange of the pin and flows downwards to the end of the wick in order to begin the cycle anew.

We claim:

1. A pinion bearing comprising in combination a cap-like bush connected to the pinion, a perforated spindle supporting said bush, a wick within the perforation of said spindle, and a spring maintaining said wick in engagement with the cap-end of said bush.

2. A pinion bearing comprising in combination a cap-like bush connected to the pinion, a perforated spindle supporting said bush, an oil reservoir at one end of said spindle, a wick within the perforation of said spindle and extending into said reservoir, and a compression spring adapted to force said wick into engagement with the cap-end of said bush.

3. A pinion bearing comprising in combination a cap-like bush connected to the pinion, a perforated spindle supporting said bush, an oil reservoir at one end of said spindle, a wick extending within said spindle and into said reservoir, a spring acting on said wick and maintaining it in engagement with the cap-end of said bush, an extension piece on said wick lapped around said spindle to extend up to the open end of said cap-like bush.

4. A pinion bearing comprising in combination a cap-like bush connected to the pinion, a perforated spindle supporting said bush, an oil reservoir at one end of said spindle, a wick extending within said spindle and into said reservoir, a spring acting on said wick and maintaining it in engagement with the cap-end of said bush, an extension piece on said wick lapped around said spindle to extend up to the open end of said cap-like bush, a shrouding cap threaded upon said spindle, and a packing ring between said shrouding cap and the open end of said bush.

5. A pinion bearing comprising in combination a cap-like bush connected to the pinion, a perforated spindle supporting said bush, an oil reservoir at one end of said spindle, a wick extending within said spindle and into said reservoir, a spring acting on said wick and maintaining it in engagement with the cap-end of said bush, an extension piece on said wick lapped around said spindle to extend up to the open end of said cap-like bush, a shrouding cap threaded upon said spindle, a packing ring between said shrouding cap and the open end of said bush, and locking means to lock said threaded cap relatively to said spindle in a desired position of axial adjustment.

6. A bearing comprising a perforated spindle, a member, closed at one end, rotatably mounted on said spindle, an absorbent within the perforated spindle, and means for maintaining said absorbent in engagement with the closed end of said member.

In testimony whereof we have hereunto affixed our signatures.

MAX RALL.
HEINRICH BISCHOFF.